Sept. 22, 1970   YASUJI AMANO ET AL   3,530,496
RECHARGEABLE ALKALINE MANGANESE CELL
Filed April 16, 1968                    4 Sheets-Sheet 1
PRIOR ART FIG. 1
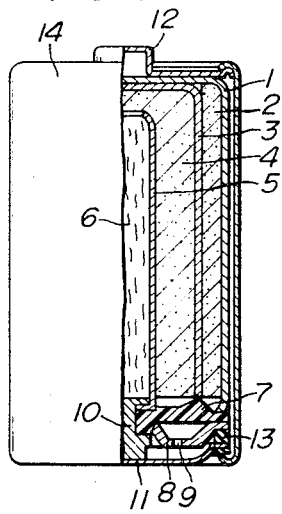
FIG. 2
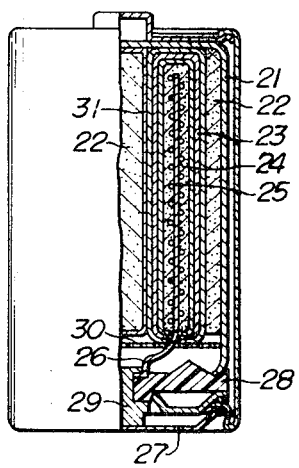
FIG. 3
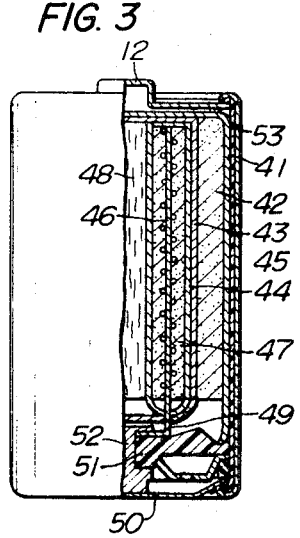
PRIOR ART FIG. 4
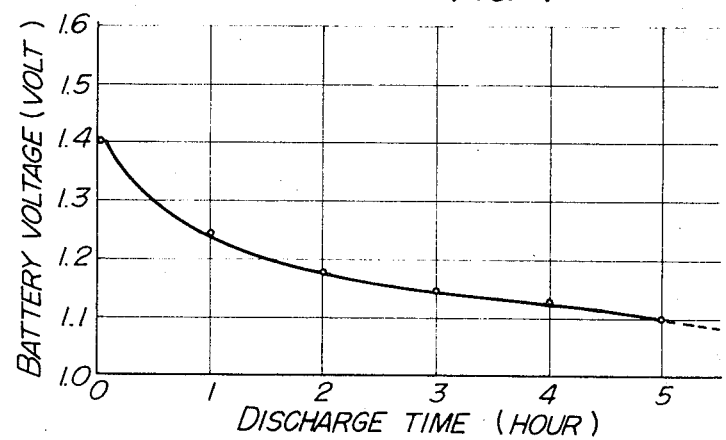

ized Sttes Patent Office 3,530,496
Patented Sept. 22, 1970

3,530,496
RECHARGEABLE ALKALINE MANGANESE CELL
Yasuji Amano, Hirakata-shi, Hiromichi Ogawa, Moriguchi-shi, Yoshiyuki Umeo, Kadoma-shi, Tsukasa Ohira, Nara-shi, and Kaoru Murakami, Kadoma-shi, Japan, assignors to Matsushita Electric Industrial Co., Ltd., Kadoma-shi, Osaka, Japan, a corporation of Japan
Filed Apr. 16, 1968, Ser. No. 721,750
Claims priority, application Japan, June 26, 1967, 42/41,413
Int. Cl. H01m 43/02
U.S. Cl. 136—30                      5 Claims

ABSTRACT OF THE DISCLOSURE

A rechargeable alkaline manganese cell comprising a positive electrode mainly of manganese dioxide, a negative electrode having a discharge capacity less than that capable of reversing the positive electrode, a separator between the positive and negative electrode, and an alkaline electrolyte; neither timer nor monitor for discharge voltage being required and the discharge being automatically limited when the discharge capacity of a negative electrode is entirely consumed.

BACKGROUND OF THE INVENTION

Field of the invention

This invention relates to rechargeable alkaline manganese cells regulating the discharge capacity of the negative electrode within the range where the reversibility or reversible depolarization of the positive electrode, mainly of manganese dioxide, is possible.

Description of the prior art

The widely and generally used Leclanché dry cells are typical cells using manganese dioxide as a major ingredient thereof. Although Leclanché dry cells of this type are extremely cheap, the stability of discharge voltage and especially the low temperature characteristic are not good. The operation region is limited and the charge of the cells are hardly practical.

A mercury cell, on the other hand, has excellent stability of voltage, showing a negligible variation of internal resistance during discharge. However, in spite of the good high temperature and preservation characteristics, the mercury cell is not suitable for high current discharge. Moreover, it is very expensive.

Recently an alkaline manganese cell has attracted attention as an intermediate between the expensive mercury cell and the cheap Leclanché dry cell.

The alkaline manganese cell has a property of voltage stability similar to that of a mercury cell while it can stand a higher load than a Leclanché dry cell.

The alkaline manganese cell can be either a primary or a secondary battery capable of being charge. In the normal use of a secondary battery the manganese dioxide mainly composing the positive electrode is not reversible between charge and discharge. However, if the discharge is stopped at about 20% of the real capacity of the primary battery, it gains considerable reversibility by charging.

The positive electrode of the alkaline manganese cells are the same mixed material as that of the Leclanché type one, i.e. manganese dioxide mixed with a conductive material such as graphite. The electrolyte used, however, is different.

Namely, the electrolyte of the Leclanché dry cells are a mixture mainly of ammonium chloride and zinc chloride while that of the alkaline manganese cell is an aqueous solution mainly of potassium hydroxide.

The potassium hydroxide electrolyte can make the internal resistance of the battery extremely low and give a high discharge voltage as the ion mobility and reaction are much more enhanced than in the ammonium chloride and zinc chloride electrolyte.

SUMMARY OF THE INVENTION

One object of this invention is to regulate the discharge depth of the positive electrode by the discharge capacity of the negative electrode.

Another object of this invention is to improve the discharge depth by mixing nickel powder into the positive electrode.

A further object of this invention is to provide a rechangeable alkaline manganese cell having a low internal resistance, a high operation voltage, a long life and low costs, regulating the discharge capacity of the negative electrode within the range where the positive electrode, mainly of manganese dioxide, is capable of reversibility.

BRIEF DESCRIPTION OF THE DRAWINGS

FIG. 1 is a partly cross-sectional side view of a prior art rechargeable alkaline manganese cell.

FIG. 2 is a partly cross-sectional side view of a rechargeable alkaline manganese cell according to one embodiment of this invention.

FIG. 3 is a partly cross-sectional side view of a rechargeable alkaline manganese cell according to another embodiment of this invention.

FIG. 4 shows the discharge characteristic of a prior art rechargeable alkaline manganese cell shown in FIG. 1.

DESCRIPTION OF THE PREFERRED EMBODIMENTS

Figure 5:
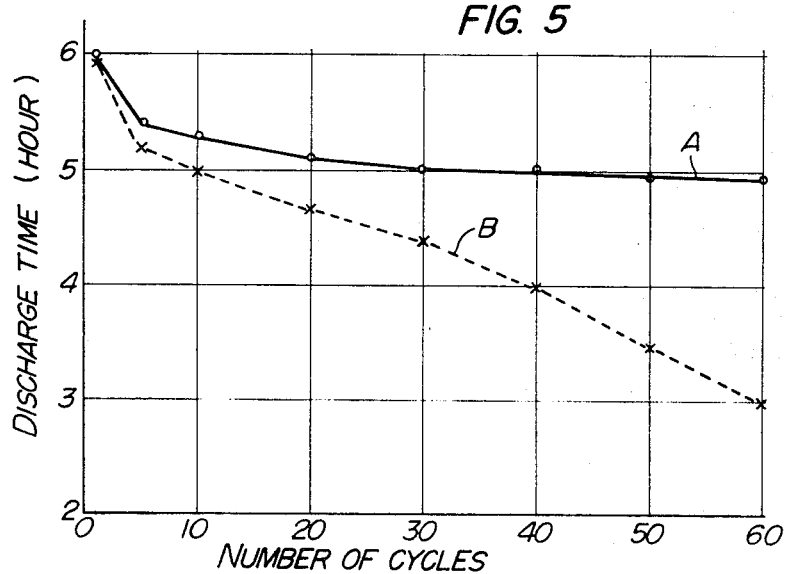
FIG. 5 shows the charge-discharge cycle characteristic of an inventive rechargeable alkaline manganese cell.

First an explanation of the structure of a prior art rechargeable alkaline manganese cell will be given.

In FIG. 1, 1 is a positive electrode can in which are accommodated in sequence from the outside towards the inside a positive cylindrical electrode 2 formed by molding a mixture of manganese dioxide and graphite, an alkali-proof sack-like separator 3, and a gel-type negative electrode 4 of a mixture of amalgamated zinc powder plus alkaline electrolyte and composite paste. a brazen split cylindrical current collector 5 is inserted in the center portion of the negative electrode 4 and filled with an electrolyte preservative 6 of cotton, etc. a plastic seal 7 seals the positive electrode can 1, and 8 is an inner metal bottom plate in which a permeable hole 9 is drilled as gas vent. A conductor 10 passes through the center of the seal 7 and rivets the bottom of the current collector 5. The cell is completed by an outer metal bottom plate 11 for the negative electrode terminal plate, a positive electrode terminal plate 12, a ring-like insulating packing 13, and a cylindrical metal jacket 14.

The rechargeable alkaline manganese cells with this structure do not have good electron conduction between the gel-type negative electrode 4 and the current collector 5 during charge and discharge. The discharge voltage is low and decreases gradually as shown in FIG. 4.

Specifically, in such a rechargeable alkaline manganese cell whose positive electrode 2 is mainly composed of manganese dioxide, the discharge is allowed only within about 20% of the real capacity of the positive electrode of the primary cell. When the cells are discharged more deeply, the active material of the positive electrode, manganese dioxide, cannot be reversible by charging to the no-discharge state, and this results in the defect that the cell loses its function. This is because manganese dioxide changes its crystal structure to form lower manganese oxide such as manganese oxihydroxide (MnOOH) and manganese sesquioxide ($Mn_2O_3H_2O$) on the reaction surface of the positive electrode 2. So, even by overcharging, the active material does not recover its no-discharge state.

Therefore, the discharge depth of the rechargeable alkaline manganese cells has been kept within the above-mentioned limit. The discharge of the cell, being operative only within this limit, should be interrupted at a certain voltage or time. In order to stop any overdischarge, such means as a discharge timer and a discharge voltage monitor are needed, these have made the use of the cell complicated. Although the cells are relatively cheap in themselves, such accessories make the costs higher.

According to this invention, the stoppage of discharge of the rechargeable alkaline manganese cells are regulated by the negative electrode made of zinc, whereby the discharge depth of the positive electrode is controlled. This structure makes it unnecessary to interrupt the discharge at a certain voltage or time. Neither timer nor monitor of the discharge voltage is necessary.

As described above the cell using a positive electrode made of a pressurized mixture of manganese dioxide and graphite powder, etc. should be used within 20% of the real capacity of the primary cell. Measurements obtained by repeating charge-discharge cycles under the condition of this discharge depth show that the service life of a prior art alkaline manganese cell using a cylindrical positive electrode of molded manganese dioxide and graphite powder is 40 to 60 cycles. The cell in which the active material of the positive electrode is regulated by the zinc negative electrode maintains the discharge capacity of the negative electrode. However, after 40 to 60 charge-discharge cycles no reversibility of the positive electrode toward the no-discharge state is possible owing to a considerable degradation of the active material of the positive electrode. One reason is that the mold of manganese dioxide and graphite forming the positive electrode swells and moistens after repeated charge-discharge cycles and forms a manganese lower oxide on the electrode surface. Gradually the binding force between the active material and the conductive material, i.e. manganese dioxide and graphite respectively, decreases and causes separation. Electric conductivity is considerably lowered and the internal resistance becomes high. In a special case 10 to 20 charge-discharge cycles cause the destruction of the positive electrode and limits the life of the cell. Another reason to be considered is that with an increase of the number of charge-discharge cycles the electrolyte moves into the positive electrode and the electrolyte around the reaction surface is absorbed therein. So the resistance of the reaction surface is liable to increase extremely. Thus the operation voltage of the cell decreases considerably. Even with a constant voltage charging, the active material, manganese dioxide, is hardly reversible owing to the increase of internal resistance.

Generally Leclanché dry cells, the electrolyte of which are mainly of ammonium chloride and zinc chloride, have a positive electrode compound of molded mixture of manganese dioxide and graphite, etc. with the electrolyte absorbed therein preliminarily. Even if the dry cells are left unused for a long time, the transfer of electrolyte into the positive electrode is hardly seen so that the variation of internal resistance is small.

In the case of an alkaline manganese cell, however, it is difficult for the positive electrode compound to absorb a sufficient amount of electrolyte preliminarily, as potassium hydroxide in the electrolyte is converted to potassium carbonate, thereby decreasing the electric conductivity of the electrolyte and increasing the reaction resistance of the cell. The positive electrode of the rechargeable alkaline manganese cells is formed to have 30 to 40% porosity by pressurized molding. Due to weak mechanical strength it should be handled carefully. As the positive electrode is a mixture of manganese dioxide and graphite only, a large increasing stress causes a distortion or a crack in the mold. Although a large pressure increases the strength of the mold, the porosity thereof and hence the absorption of electrolyte therein decreases, deteriorating the characteristic of the cells. Further, when a relatively short time charge and a normal discharge are repeatedly performed using such a positive electrode compound, a portion of the molded positive electrode collapses and adheres like a paste to the separator. This causes a short-circuiting between the positive and the zinc negative electrode.

In a rechargeable alkaline manganese cell according to this invention in which the discharge depth is regulated by the discharge capacity of the negative electrode, nickel powder is mixed with the active material, manganese dioxide, and graphite powder and the combination is then molded by pressure in the same way as in a prior art positive electrode.

The positive electrode with the added nickel powder can make the cycle life extend two or three times as long as that of a prior art one consisting of manganese dioxide and graphite only. The nickel addition increases the electric conductivity of the positive electrode and also considerably the mechanical strength thereof. The swelling and peeling off of the positive electrode during the repetition of charge and discharge cycles can be diminished considerably.

The addition and mixing of nickel powder also strengthens the binding force between graphite and manganese dioxide. The swelling of the positive electrode mold due to the transfer of electrolyte into the mixed compound can be prevented. An increase of electric conductivity yields a uniform charge and discharge. Thus, the increase of internal resistance is extremely small even after many charge-discharge cycles. When use is made of the positive electrode of this invention, mixed with nickel powder, a discharge depth of up to 30% of the real capacity of the primary cells are allowable as compared to only 20% in the case of the conventional positive electrode.

Thus a rechargeable alkaline manganese cells using the inventive positive electrode mold mixed with nickel powder can have a real capacity per cycle about 1.5 times as large as that of a prior one. It is apparent from FIG. 8 that the discharge depth should be limited to about 30% of the real capacity of the positive electrode.

Figure 8:
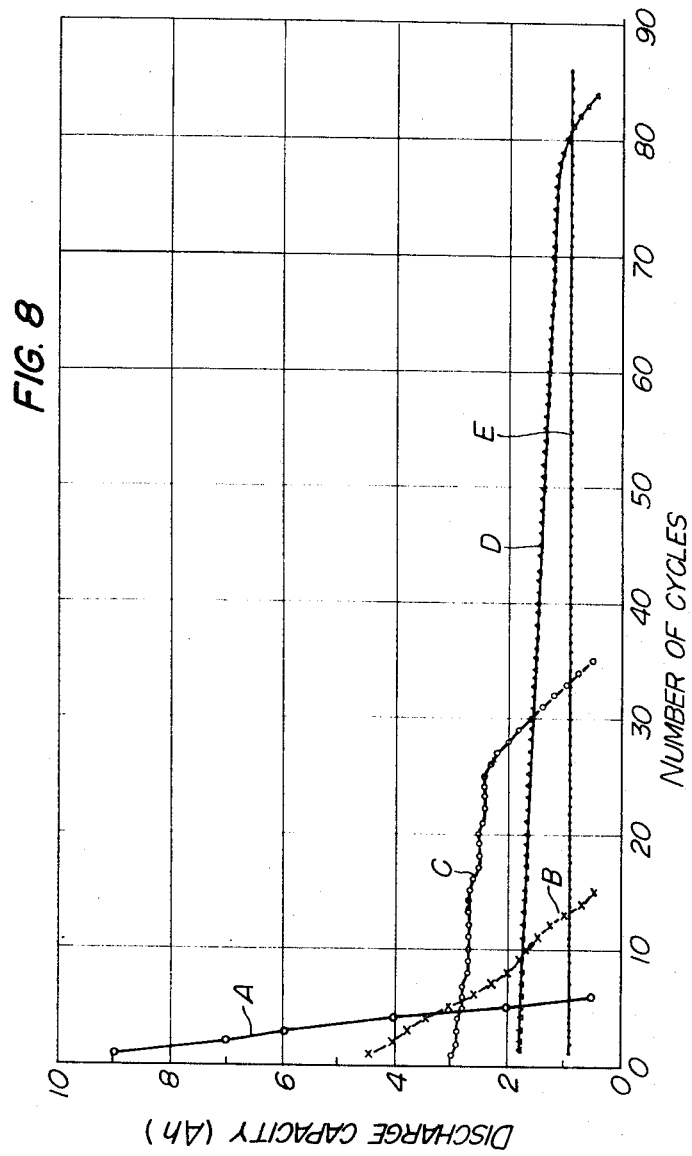
FIG. 8 shows the charge-discharge cycle characteristics of the inventive rechargeable alkaline manganese cells having different discharge depths.

FIG. 8 shows the decay characteristics vs. cycle of the real capacity in the cases when the discharge depth of the positive electrode is made 100% (perfect discharge), 50%, 30%, 20%, and 10% by varying the real capacity of the zinc negative electrode. It is therefore clear that the lower the discharge depth of the positive electrode is the better the cycle life and the reversibility by charge of the positive electrode mainly of manganese dioxide will be.

However, if the discharge depth is too low, the real capacity becomes small and impractical.

In FIG. 8, A shows the relation between the charge-discharge cycle and the discharge capacity when a 100% discharge is made repeatedly followed by a perfect charge. The result of charge-discharge cycles at 50% discharge is shown at B. The cases of 30%, 20% and 10% discharge depths are shown at C, D and E, respectively. The results are summarized in Table 1.

TABLE 1

| Discharge depth, percent | Number of cycles | Total capacity through the service life (AH) |
| --- | --- | --- |
| 100 | 6 | 25~29 |
| 50 | 15 | 34~36 |
| 30 | 35 | 70~80 |
| 20 | 84 | 100~120 |
| 10 | >90 | >100 |

Figure 9:
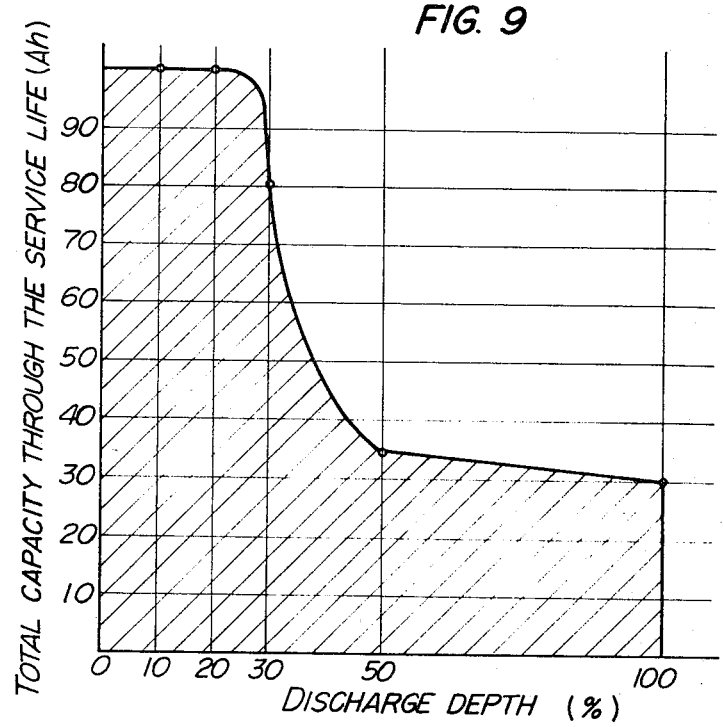
FIG. 9 shows the characteristic of the total discharge capacity of the cells shown in FIG. 8.

FIG. 9 shows the results of Table 1. It is understood that the decrease of total capacity of the cell at a more than 50% discharge depth is considerably large while a lower discharge at less than 10% discharge depth is not practical as the capacity of employment for each use is small. If, however, the cell is used in a system with a low efficient discharge and compensating charge, the total capacity can be large without causing any problem.

If improvements are made in the structure of the rechargeable alkaline manganese cells in view of the above-mentioned two facts, the characteristic can be made better.

The conventional rechargeable alkaline manganese cells as shown in FIG. 1 have the following structure. The positive electrode 2 is made in close contact with the inner wall of the cell can 1, on the inner side of which a sack-like separator 3 having alkali-proof property is provided. The negative electrode 4 consisting of a mixture of amalgamated zinc powder, alkaline electrolyte, and composite paste is an adhesive gel contained in the separator 3. The brazen split cylindrical negative electrode current collector 5 is inserted in the center portion of the negative electrode. In such a structure the positive electrode takes part in the reaction only in the inner surface of the positive electrode. Namely, since the reaction surfaces of the negative electrode 4 and the positive electrode 5 are only their opposing side faces, the utilization efficiency decreases at high efficient discharges without giving a flat voltage characteristic. For example, D-size cell is considerably deteriorated by a constant current discharge at 500 ma.

In order to improve the above-mentioned type of cell if the rechargeable alkaline manganese cells are designed to be regulated by the zinc negative electrode, the amount of active material filling-up the gel-type zinc negative electrode may be reduced so that considerable space is left in the center portion of the battery can. When the active material layer of the positive electrode is made thick, the space in the cell can be utilized effectively, the packing capacity at the positive electrode body being increased. However, a decrease of inner diameter of the positive electrode lessens the area in contact with the negative electrode and hence the reaction surface area. This only results in a degradation of the cell characteristic. If the active material at the positive electrode is made thin so as to increase the reaction surface area, the packing capacity decreases and no good characteristic can be expected. This has been the defect existing in the conventional alkaline manganese cell.

According to this invention, the discharge capacities of the rechargeable alkaline manganese cells are regulated by the zinc negative electrode, the capacity of which is controlled within a range where the positive electrode mainly of manganese dioxide can be reversed. The reaction surface is enlarged so that the above-mentioned defect can be eliminated. Embodiments will be explained hereunder.

The structure according to one embodiment is shown in FIG. 2. In the positive electrode can 21, a positive electrode 22 is formed, by mixing manganese dioxide as an active material, graphite powder as a conductive agent, and nickel powder together and molding them under pressure in close contact with the inner side of the case 21. A separator 23 is formed by an oxidation-free and alkali-proof polyamide series woven cloth in contact with the inner surwace of the positive electrode 22, a cellulose series non-woven cloth and a semipermeable membrane both in contact with the inner side of the polyamide cloth. A paste type negative electrode 24 is formed by mixing and kneading amalgamated zinc gel, or zinc powder, and a paste such as sodium carboxymethylcellulose and coating them on a 16 to 20 mesh metal net of 0.2 mm. $\phi$ copper wire. A current collector 25 is embedded in the center portion of the negative electrode. One end protrusion of the current collector 25 is prevented from being in contact with the positive electrode by means of an alkali-proof tube or a coated resin. A connector tab 26 connecting the current collector to the negative electrode terminal plate 27 is riveted to the conductor 29 passing through the plastic seal plate 28. An alkali-proof insulating resin plate 30 separates the positive electrode 22 from both the bottom of the negative electrode 24 and the upper portion of the current collector 29. A perforated metal plate or a metal net 31 is positioned at the inner side of the negative electrode 24 to form a pocket container, in which the mold of the positive electrode compound 22 is filled.

Thus the positive electrode 22 is positioned at both inner and outer sides of the negative electrode 24 with the separator 23 being inserted therebetween. By this structure both the surfaces of the negative electrode 24 take part in the reaction so that a uniform reaction is performed. The utilization efficiency of the negative electrode active material is improved. The disposition of the positive electrode 22 at the center portion increases the packing capacity thereof. Further, in FIG. 2 the mold of the positive electrode compound disposed in the center portion of the positive electrode can 21 may be adhered around the periphery of a graphite rod (not shown), which is introduced to be in contact with the positive electrode terminal portion and gain a good electric conductivity. In this structure when the positive electrode compound is molded like a cylinder and put in the sealed cylindrical pocket container having 10 to 30% porosity and one of the upper and lower faces of the pocket container is made in contact with the positive electrode terminal for the current collection by means of welding or pressing, the reaction surface area is nearly doubled and the cell can stand a high rate discharge. The pocket container may be a perforated metal plate or a metal net, etc.

With the use of a porous pocket container a constant interval from the separator can be maintained, whereby any lower oxide can be prevented from appearing on the surface of the positive electrode and thereby the electric conductivity is improved.

Effects of the cells having the above-mentioned structure are as follows. Since the paste-type zinc negative electrode contributes to the reaction on both surfaces, the reaction proceeds uniformly. The utilization efficiency for the active material of the negative electrode is improved. The disposition of the positive electrode in the center portion increases the packing capacity of the positive electrode compound. Therefore, the charge-discharge current density decreases. Even if the discharge depth is limited to about 40% of the real capacity of the positive electrode of the primary battery, the D-size cells are found to have a capacity more than 1.5 times as large as that of the conventional one.

In order to examine the effect of this invention D-size rechargeable alkaline manganese cells were manufactured for trial and the characteristics were compared with those of prior art ones.

According to this embodiment both surfaces of the negative electrode make a uniform reaction while in the conventional cell only one surface contributes thereto. The cell having the above-mentioned structure was examined at 0.4 a. constant current discharge and charged at 1.75 to 1.80 v. constant voltage for 16 hours. The cycle life test was repeatedly made and the cycle characteristic as shown by the curve A in FIG. 5 was obtained. A prior art cell cycle characteristic is shown at B which cell, not being regulated by the zinc negative electrode, was discharged at 0.4 a. until 1.05 v. and charged at 1.75 to 1.80 v. for 16 hours.

Figure 6:
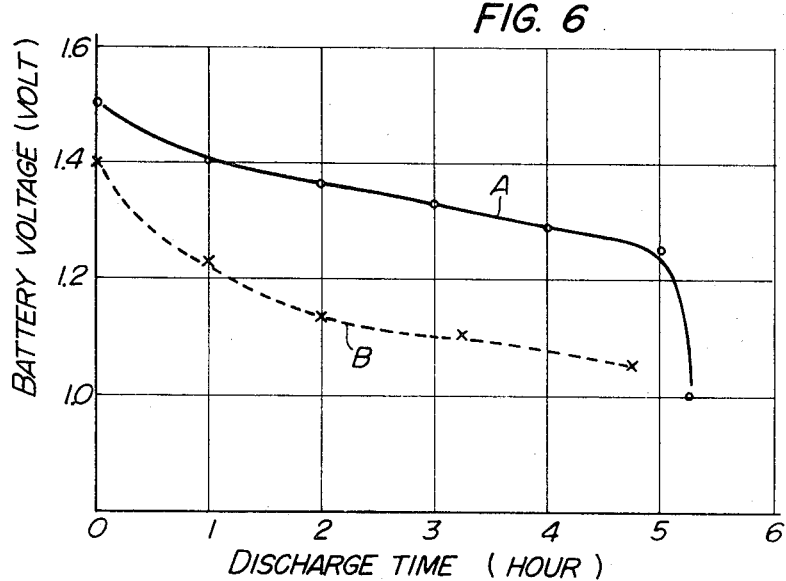
FIG. 6 shows the discharge characteristic of the inventive cell.

The inventive cell using the positive electrode compound as disclosed in the embodiment shows little decay in relation to the number of cycles. The discharge characteristic curve in FIG. 6 after 10 to 20 cycles shows the inferiority of the conventional cell, A and B corresponding to the inventive and the prior art ones respectively. The discharge current was constant at 0.4 a. The figure shows that the difference between the curves A and B is due to the influence of the real current density at the reaction surface which differs much in the two cells even at a constant current discharge. As the positive electrode for the case of curve A contains nickel powder therein, the charge efficiency is improved. This fact may be attributed to the increase of current density. Further, the uniform reaction is due to the contribution of both surfaces of the negative electrode to the reaction, increasing utilization efficiency. These results show that it is possible to decrease the theoretical capacity of the paste-type zinc negative electrode.

Figure 7:
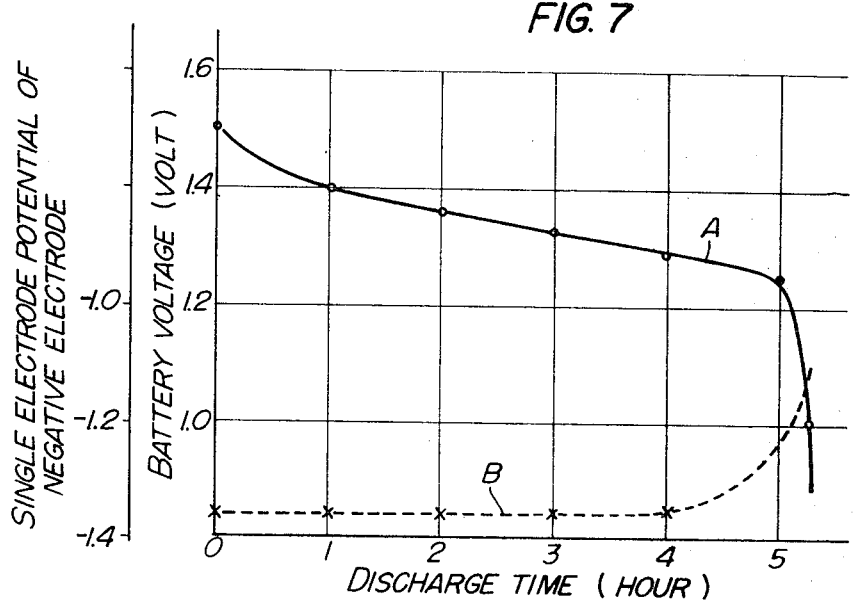
FIG. 7 shows the discharge characteristic of a zinc negative electrode used in an inventive cell versus a mercuric oxide reference electrode.

The result of measurement shown in FIG. 7 of the single electrode potential of the zinc negative electrode having the structure as shown in FIG. 2 makes it clear that there occurs a rapid increase in the potential in the last stage and a rapid decrease in the cell voltage. In FIG. 7, A is the curve of discharge terminal voltage and the curve B compares the single electrode potential of the zinc negative electrode with the mercury oxide reference electrode during discharge. The discharge current was constant at 0.4 A. The cell voltage shown by A decreases rapidly from 1.0 v. So it is understood that the discharge depth of the positive electrode is under control. It is also confirmed that the positive electrode can recover completely by charge to the no-discharge state.

When the battery is used at a relatively low current, there is no need for disposing the mold of the positive electrode active material in the center portion. The structure shown in FIG. 3 is sufficient for such a purpose. In FIG. 3, a cell can 41 is shown in which a positive electrode 42 is molded closely to the inner wall by pressing. In the inner side of the positive electrode 42 an alkali-proof separator such as polyamide series (nylon) non-woven cloth 43 or woven cloth is disposed. The inner side of the separator is provided with a negative electrode 47 formed by coating a mixture of zinc powder and zinc oxide powder kneaded with binder on a metal net 46 or by pressure molding zinc powder to a cylinder. Inside the negative electrode 47 is provided an electrolyte preservative 48 of a porous mat such as cotton having a liquid preservation property. A lead wire 49 leads to the negative electrode terminal plate 50 and is riveted with a conductor 52 passing through the center of the seal plate 51. The lead wire may be a metal spring or a U-shaped perforated spring. A connector tab may be used for coating the paste on the metal net or the perforated metal plate to form the negative electrode. A pipe synthetic resin 53 has the property of thermal contraction.

The D-size type rechargeable alkaline manganese cells having the structure as shown in FIG. 3 were discharged at a constant current of 0.2 a. and charged at a constant voltage of 1.75 to 1.80 v. for 16 hours repeatedly. The results as shown in FIG. 8 were obtained. As evident from this figure, decay with the charge-discharge cycle is relatively small at a low rate discharge. Thus a practically usable cell regulated by the zinc negative electrode is obtained.

In such a low rate discharge the positive electrode need not have nickel powder added.

When graphite and nickel powder are added to the active material, i.e. manganese dioxide, of the positive electrode, it was found after many experiments that their best weight ratio is 80 parts of manganese dioxide, 10 parts of graphite and 10 parts of nickel powder. Although 5 parts of nickel powder is enough to cause an increase in the electric conductive and mechanical strength, no sufficient effect can yet be expected. With the addition of more than 10 parts of nickel powder no improvement is made in the efficiency of the cell due to the reduction of the amount of manganese dioxide.

From a structural point of view the negative electrode is preferably molded on the inner wall of the battery can with pressure. In another case a separated mold may be disposed on the inner wall of the battery can.

Although in the above description zinc powder has been used as the negative electrode, cadmium and iron powder may be used to the same effect.

It is thought that these alterations and modifications fall within the scope and concept of this invention.

We claim:

1. A rechargeable alkaline manganese cell consisting of a positive electrode mainly of manganese dioxide, a zinc negative electrode having a discharge capacity less than 20% of the real capacity of said positive electrode, a separator separating said positive and zinc negative electrode, and an alkaline electrolyte.

2. A rechargeable alkaline manganese cell consisting of a positive electrode of manganese dioxide, graphite and nickel powder, a zinc negative electrode having a discharge capacity less than 30% of the real capacity of said positive electrode, a separator separating said positive and zinc negative electrode, and an alkaline electrolyte.

3. A rechargeable alkaline manganese cell consisting of two positive electrodes mainly of manganese dioxide, a zinc negative electrode disposed between said two positive electrodes and having a discharge capacity less than 40% of the real capacity of said positive electrode, a separator separating said positive and negative electrode, and an alkaline electrolyte.

4. A rechargeable alkaline manganese cell according to claim 2, wherein the weight ratio between manganese dioxide, graphite, and nickel powder contained in the positive electrode is 8:1:1.

5. A rechargeable alkaline manganese cell comprising a positive electrode mainly consisting of manganese dioxide, a negative zinc electrode having a discharge capacity less than 40% of the total discharge capacity of said positive electrode capable of exhibiting reversibility by charging, a separator separating said positive and negative electrodes, and an alkaline electrolyte.

References Cited

UNITED STATES PATENTS

| | | | |
|---|---|---|---|
| 1,288,722 | 12/1918 | Snelling | 136—138 |
| 2,678,343 | 5/1954 | Daniel | 136—28 |
| 3,174,878 | 3/1965 | Peters | 136—28 |
| 3,174,879 | 3/1965 | Stanimirovitch | 136—28 |
| 3,288,642 | 11/1966 | Kordesch | 136—6 |
| 3,332,802 | 7/1967 | Clune et al. | 136—107 |

WINSTON A. DOUGLAS, Primary Examiner

C. F. LeFEVOUR, Assistant Examiner

U.S. Cl. X.R.

136—107